US011554820B2

(12) United States Patent
Mercier et al.

(10) Patent No.: US 11,554,820 B2
(45) Date of Patent: Jan. 17, 2023

(54) FIFTH WHEEL HITCH CONNECTION SYSTEM

(71) Applicant: HORIZON GLOBAL AMERICAS INC., Plymouth, MI (US)

(72) Inventors: Gregoire P. Mercier, Plymouth, MI (US); Mark Scruggs, Walled Lake, MI (US); Timothy S. Arrick, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 15 days.

(21) Appl. No.: 16/619,158

(22) PCT Filed: Jun. 6, 2018

(86) PCT No.: PCT/US2018/036248
§ 371 (c)(1),
(2) Date: Dec. 4, 2019

(87) PCT Pub. No.: WO2018/226822
PCT Pub. Date: Dec. 13, 2018

(65) Prior Publication Data
US 2020/0156718 A1 May 21, 2020

Related U.S. Application Data

(60) Provisional application No. 62/515,566, filed on Jun. 6, 2017.

(51) Int. Cl.
*B62D 53/08* (2006.01)

(52) U.S. Cl.
CPC .................. *B62D 53/0828* (2013.01)

(58) Field of Classification Search
CPC ............... B62D 53/0828; B62D 53/08; B62D 53/0814; B62D 53/0807; B62D 53/10; B60D 1/488
See application file for complete search history.

(56) References Cited

U.S. PATENT DOCUMENTS

| 3,580,611 | A | 5/1971 | McNitt | |
|---|---|---|---|---|
| 5,368,324 | A * | 11/1994 | Kaim | B62D 53/08 280/438.1 |
| 5,772,229 | A | 6/1998 | Cattau | |
| 6,170,850 | B1 | 1/2001 | Works | |
| 7,699,334 | B1 | 4/2010 | Mann et al. | |
| 8,342,558 | B1 * | 1/2013 | Su | B62D 53/0828 280/438.1 |

(Continued)

OTHER PUBLICATIONS

Patent Cooperation Treaty (PCT), International Search Report and Written Opinion for Application PCT/US2018/036248 filed Jun. 6, 2018, dated Sep. 24, 2018, International Searching Authority, US.

*Primary Examiner* — Jacob D Knutson
*Assistant Examiner* — Abigail R Hymel
(74) *Attorney, Agent, or Firm* — McDonald Hopkins LLC

(57) ABSTRACT

A connection system for a fifth wheel hitch assembly or other vehicle accessory includes a plurality of interlocking flanges are received in corresponding ports. Additionally, a plurality of fasteners are used in combination with friction bushings. This overall combination creates a synergistic effect that enables the connection of high load components along a single shear facing.

19 Claims, 4 Drawing Sheets

(56) References Cited

U.S. PATENT DOCUMENTS

| | | |
|---|---|---|
| 8,573,627 B2 | 11/2013 | Appel |
| 2004/0145151 A1* | 7/2004 | Grinde .................. B62D 53/12 280/438.1 |
| 2008/0289143 A1* | 11/2008 | Lu ......................... F16B 37/068 16/2.4 |
| 2014/0346754 A1* | 11/2014 | Zerba ................ B62D 53/0814 280/433 |

* cited by examiner

FIFTH WHEEL HITCH CONNECTION SYSTEM

CROSS-REFERENCE TO RELATED APPLICATIONS

This application is a 35 U.S.C. § 371 national stage application of PCT Application No. PCT/US2018/036248 filed on Jun. 6, 2018, entitled "FIFTH WHEEL HITCH CONNECTION SYSTEM", which claims priority to U.S. Provisional Patent Application Ser. No. 62/515,566 filed on Jun. 6, 2017, each of which are incorporated by reference herein.

TECHNICAL FIELD

The present invention relates generally to a fifth wheel hitch assembly, and more particularly, to a fifth wheel hitch assembly comprising a multi-point connection assembly.

BACKGROUND

Fifth wheel hitches are used with a towing vehicle, such as a pick-up truck, to engage a towed vehicle for towing. In this context, the fifth wheel hitches involve universal products that are typically operated by untrained operators, and may be configured to connect trailers to pickup trucks. Significantly, load ranges have steadily risen over the years from 7,000 lbs. up to about 32,000 lbs. or even more. In fact, a relatively recent need for high load towing applications (i.e., loads over 20,000 pounds) has been spurred, in part, by improvements to vehicle towing capacity.

Fifth wheel and other high load hitches and applications are usually connected to the frame of the towing vehicle by way of specialized mounting systems. Owing to the excessive forces exerted by such loads, these mounting systems attach directly to unitary structures on the hitch itself, either on top of the load bed or underneath the body of the vehicle itself. The hitch assemblies necessarily possess a durable construction that is more expensive, especially in comparison to smaller loads, thereby making high load systems prohibitively expensive and difficult for untrained users to install.

Mounting systems can rely on a plurality of rails accessible in or under the load bed of the vehicle to ensures good distribution of load weight on the vehicle. In turn, the hitch assembly itself has a pair of legs attached to the rails, and a center section including a head or kingpin receiving assembly fits between the legs. To minimize shear and tension, the legs may be monolithically formed with the kingpin receiving assembly, or durable connections relying on a pair of U-shaped members have been used. The later connection arrangement gives rise to modular hitch assemblies with separately assembled components to simplify transportation and sale of the pre-installed assemblies.

An improved connection between the legs and center section that better distributes load, maximizes clamping force, and permits quick and easy alignment of the components during assembly would be welcome. More generally, a two part assembly that allowed for separate manufacture, packaging, and/or assembly of these components in a manner that may reduce costs and simplify installation of the hitch.

SUMMARY

In one aspect, a system for attaching a fifth wheel hitch to a mounting system positioned on a towing vehicle may include any combination of the following features:

- a first fastener cooperating with a first flanged aperture on a vertical facing of the mounting system and wherein the first flanged aperture is received by a corresponding first aperture in a component facing of the hitch;
- a second fastener cooperating with a pair of second apertures on the component facing and the vertical facing;
- a third fastener cooperating with a pair of third apertures on the component facing and the vertical facing;
- wherein the first, second, and third fasteners each have a longitudinal axis and the longitudinal axes of the first, second, and third fasteners are all aligned in a parallel orientation;
- wherein the first flanged aperture and the second aperture on the vertical facing are positioned along a substantially horizontal line and the third aperture is above the horizontal line;
- wherein the first fastener has a distal, threaded end received in a threaded portion of the first flanged aperture;
- wherein at least one of the second and third fasteners has distal, threaded ends received in a threaded portion of the second and/or one of the third aperture;
- wherein the distal, threaded end of the first fastener is disposed opposite to the distal, threaded end of the at least one of the second and third fasteners;
- wherein the third aperture is centered between the first and second flanged apertures;
- at least one friction member provided proximate to each or all of the first, second, and third fasteners;
- wherein a first of the pair of second apertures includes a second flange and a second of the pair of second apertures receives the second flange; and
- wherein a first of the pair of third apertures includes a third flange and a second of the pair of third apertures receives the third flange.

In a second aspect, a system for connecting vehicle components along a single shear surface may have any combination of the following features is also contemplated:

- a leg assembly attachable to a component facing by way of an interlocking flange having a port receiving a flanged aperture;
- wherein the flanged aperture receives a fastener;
- wherein the interlocking flange includes a friction member fitted around the flanged aperture;
- wherein a distal end of the fastener has threads which engage corresponding threads positioned with the flanged aperture;
- wherein the port is an through-aperture or a recess;
- a plurality of interlocking flanges;
- wherein there are three interlocking flanges and where one of the interlocking flanges is positioned vertically offset at a midpoint between two horizontally aligned interlocking flanges;
- wherein a series of ports are provided at different elevations along the single shear surface so that the flanged aperture may be received by any one of the series of ports in order to adjust an elevation of the connected vehicle component; and
- wherein a series of paired ports are provided at different elevations along the single shear surface so that each flanged aperture may be received by any one of the series of paired ports in order to adjust an elevation of the connected vehicle component.

The aspects specifically described above are not intended to be limiting, and the features of one may be combined with features from the other. Additionally or alternatively, any of the other features described or associated with the disclosure and drawings below may also be included.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation of the present teachings may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein. In the drawings:

FIG. 2A is a perspective view of the connection system according to certain disclosed aspects, while

FIG. 3A is a sectional perspective view of the connection system, while

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of this disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, the term fastener should be understood broadly and in its specific context. While the descriptions below are preferred, fasteners may encompass any known assembly, including cooperating nuts and bolts of any kind, with or without washers or additional items such as lock nuts, and machine or other screw types that cooperate with corresponding threaded or partially threaded apertures or recesses formed on or in the opposing component. Dowels with modified, lockable ends and other mechanisms capable of connecting two planar components while exhibiting significant resistance to shearing forces may also be used.

It is noted that the various embodiments described herein may include other components and/or functionality. It is further noted that while various embodiments refer to a fifth wheel hitch and kingpin engagement, various other systems may be utilized in view of embodiments described herein. Further, the present system may include a variety of components and should not be construed as limited only to the components discussed below.

Figure 1A:
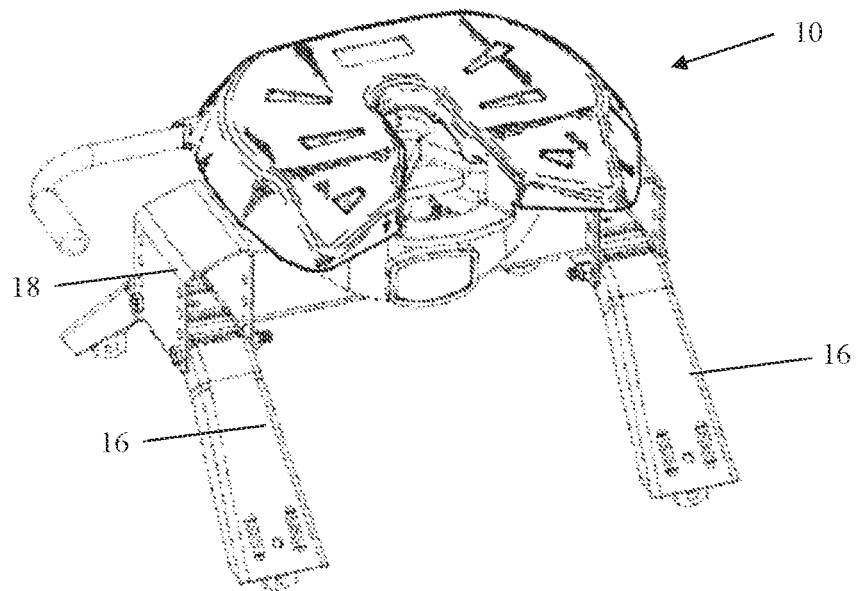
FIGS. 1A and 1B are perspective views of prior art fifth wheel hitches which may be amendable to the inventive coupling system.
Figure 1B:
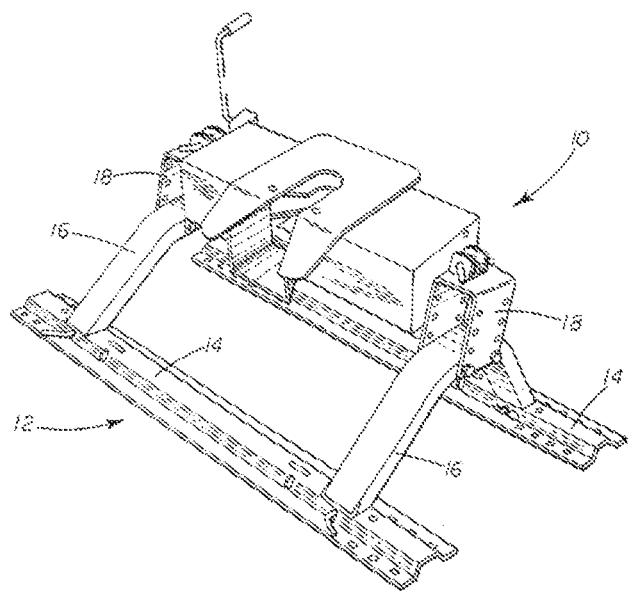

FIGS. 1A and 1B depict conventional attachments for the components of modular fifth wheel hitch assemblies 10. The assembly 10 comprises a center section and a pair of tubular legs 16. The legs 16 attach to a mounting system 12 which may include a pair of rails 14 aligned in and attached to the vehicle (not shown). Center section is a fifth wheel hitch assembly. U-shaped support member 18 attaches to the center section on its opposing ends, while the legs 16 fit within and are attached to U-shaped member. This effectively creates a double shear connection to distribute the load.

One drawback of support member 18 is that the two-point attachment limits the clamping force exerted only to the area immediately proximate to and between the bolts. Further, this arrangement may be difficult to align and install because both U-shaped members must be fitted down onto the legs simultaneously while also inserting bolts to prevent rotation. Finally, the requirement to have a fixed attachment between the U-shaped members of the support member and the center section itself results in larger diameter component that is comparatively more difficult to sell as modular, easy-to-assembly unit.

The present disclosure contemplates a multi-point, single shear connection in a towing or other vehicle component. The multi-point connection includes a series of fasteners engaging an interlocking, flanged aperture on one component wherein the flange fits in and cooperates with an aperture in the corresponding component. The fasteners are arranged in opposing positions and at differing elevations (relative to the horizon). A plurality of friction members fitted around the flanged aperture are also employed. This arrangement simplifies the alignment process during installation, allows for a modular set up, and allows for high load (i.e., 20,000 pounds or more) connections by providing wide clamping area, longer threaded connections, and more even distributed shearing forces along a single facing where the components are attached.

The system is expected to have particular utility in modular fifth wheel hitches, where connection must be made between a head or center section and a plurality of legs. The tubes are then attached to the vehicle itself. Nevertheless, the multi-point, single shear connection described herein may also be used to created attachments between the vehicle and a component and/or between components of an underbed or top bed mounting system and the like. Additionally, because the system may rely on tubular connections in certain embodiments, it enables certain strength to weight advantages in comparisons to embodiments relying on and/or requiring solid components.

Figure 2A:
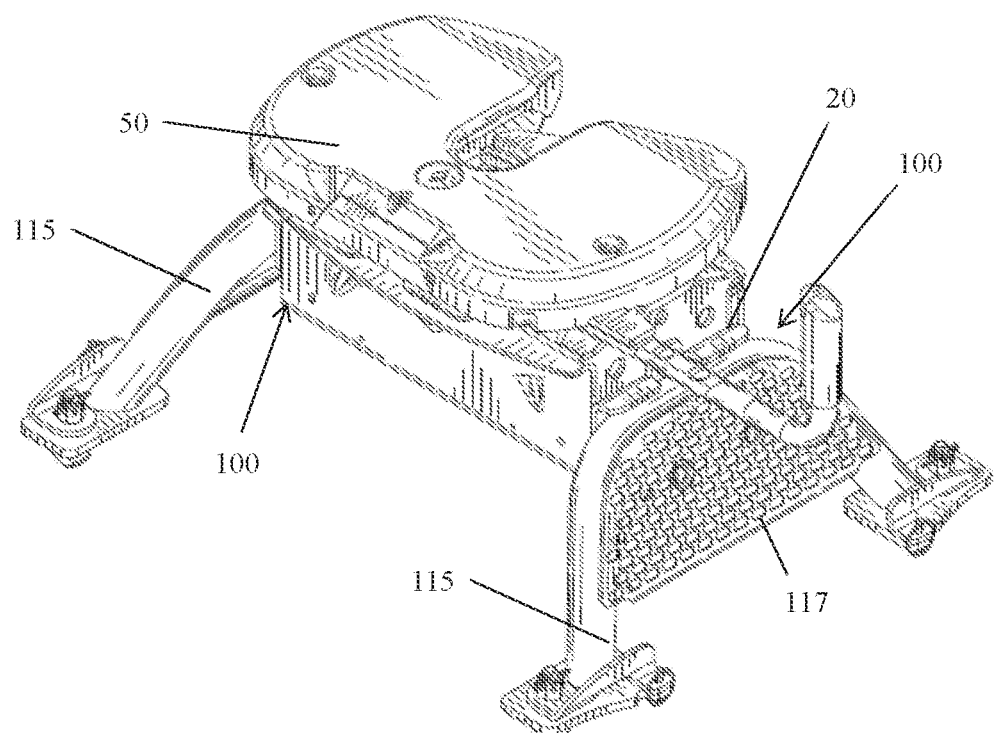
Figure 2B:
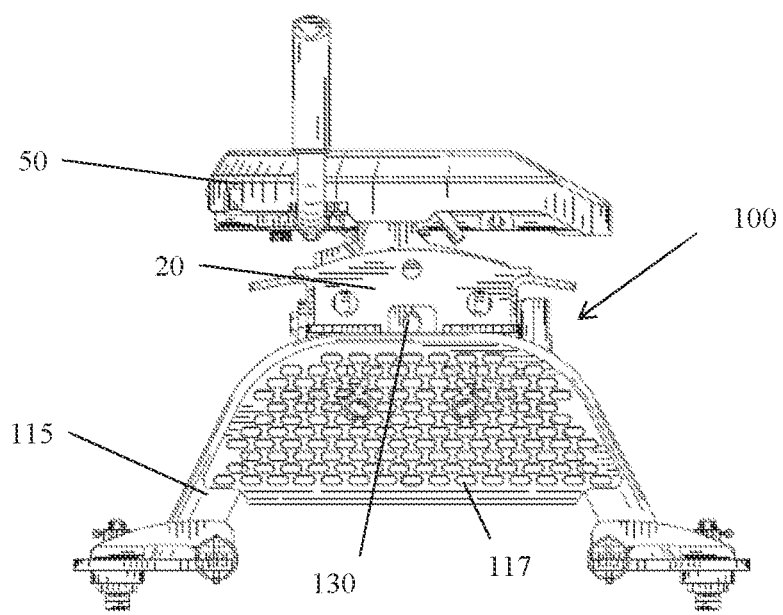
FIG. 2B is a side view of this same system.

A connection system 100 according to certain aspects of the invention can be seen in combination with a fifth wheel hitch assembly 50 is shown in FIGS. 2A and 2B. A pair of leg assemblies 115 may be formed from hollow or solid tubular members. Fifth wheel hitch assembly 50 is positioned between and attached to the leg assemblies 115 by way of connection system 100. In particular, fifth wheel hitch assembly 50 may have a pair of component facings 20 designed to fit within and attach to corresponding features on the leg assemblies 115, as described below. In turn, the leg assemblies 115 may be attached to the load bed of a vehicle by conventional means, including attachment rails or connections directly fastened to the vehicle frame or other similarly sturdy objects. Examples of attachment rails and alternatives thereto are disclosed in U.S. Pat. No. 8,414,009, which is incorporated by reference herein.

While a fifth wheel hitch assembly is shown, it will be understood that other towing apparatus and/or systems that may be carried in and attached to a vehicle load bed can be substituted for fifth wheel hitch assembly 50. In fact, any object that may be fitted with component facings 20 is amenable for attachment to a vehicle load bed via the connection system 100.

Figure 3A:
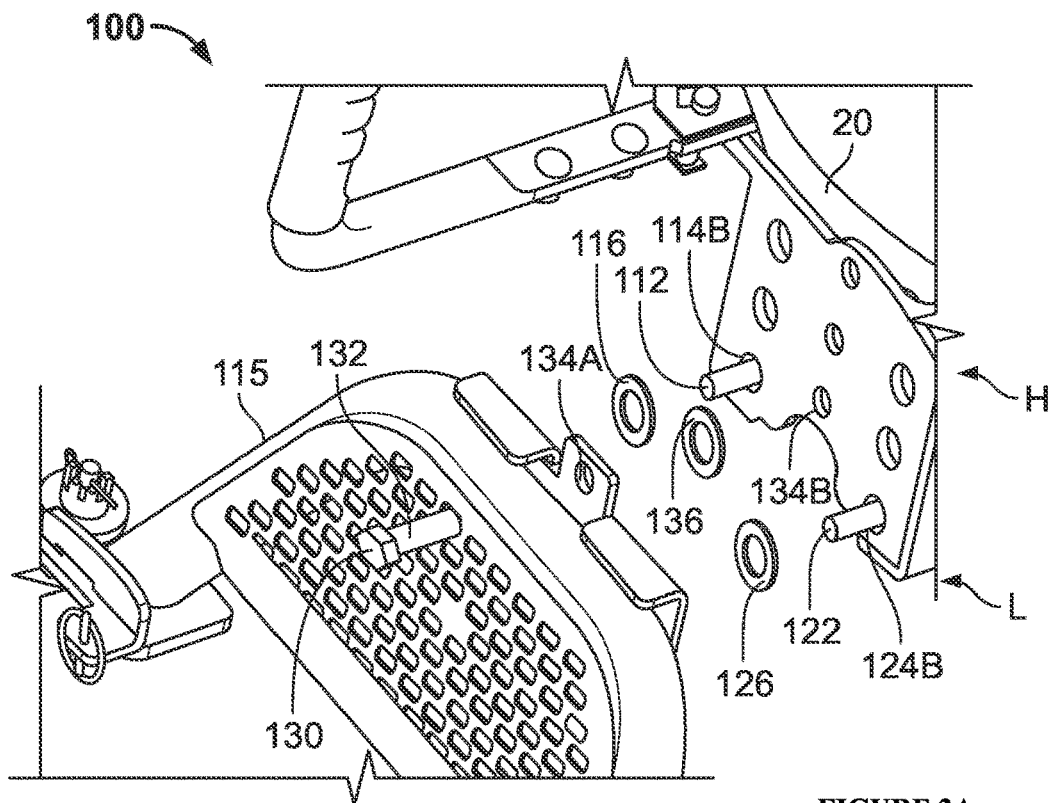
Figure 3B:
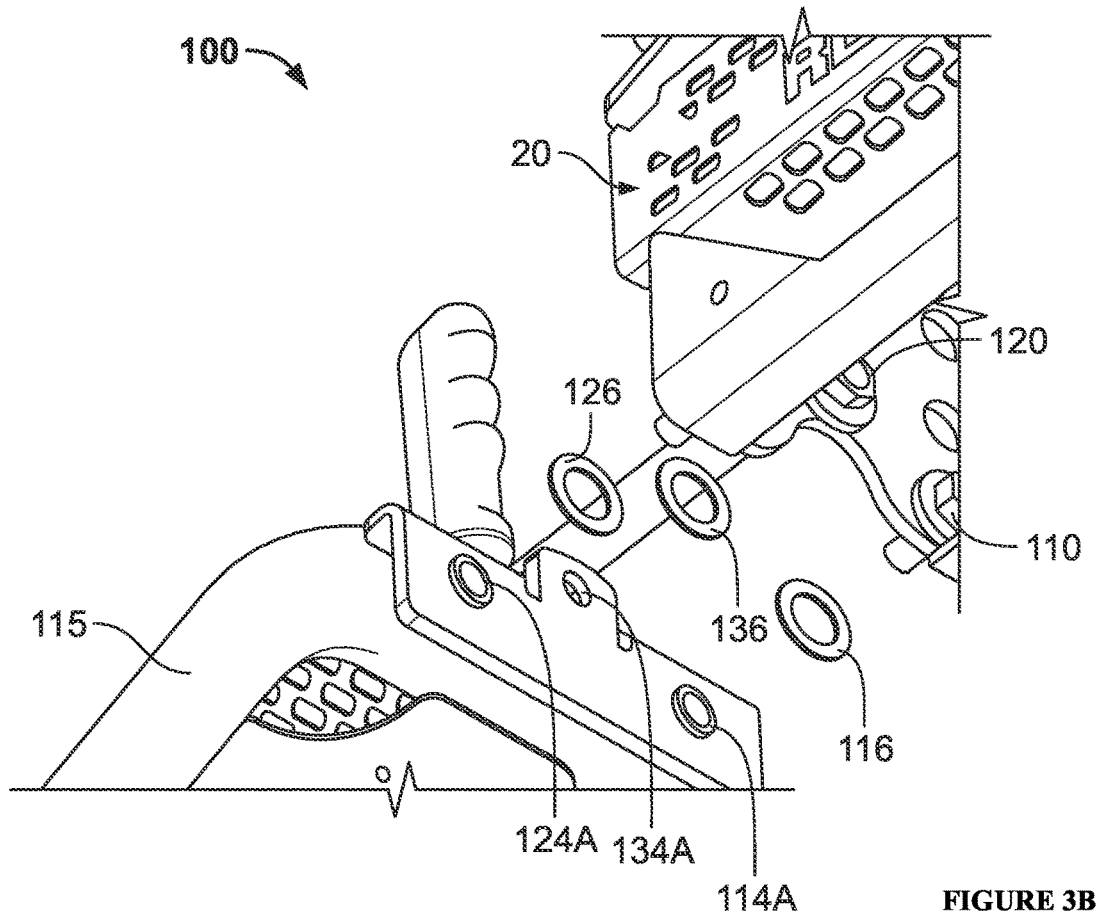
FIG. 3B is an opposing, sectional perspective view taken at a reversed vantage point relative to FIG. 3A.

FIGS. 3A and 3B illustrate the connection system 100. In one aspect, a pair of planar, vertically oriented surfaces, attachable to component facings 20, are integrally formed on or attached to attachment leg assemblies 115. Leg assemblies 115 and component facings 20 are coupled directly together by way of an interlocking flange system including a aperture or port defined by a protruding flange (e.g., 124A) that is formed in the vertical facing of the leg assembly 115 and received within corresponding aperture or port (e.g., 124B) from the component facing 20. When aligned, the ports provide a passageway for a fastener or bolt (e.g., 120). The ports may be through-holes or recesses formed in the opposing faces of the two coupled surfaces.

Generally speaking, the fasteners 110, 120, 130 have a diameter that matches the flanged aperture/port 114A, 124A, 134B, while that flange has a diameter that matches the corresponding aperture (or the port) 114B, 124A, 134B. This type of interlocking connection requires the head of the fastener to be sized sufficiently to engage the outer surface of the vertical facing on the leg assembly 115 or the component facing 20 so as compress the components together when the fastener is tightend. To that end, threaded ends 112, 122, 132 may be provided on the fasteners to engage a counter-bored or threaded inner surface of the flanged aperture 114A, 124A, 134B to engage corresponding threads on the fastener. Friction members 116, 126, 136, in the form of bushings fitted around the flanges, create friction and further distribute the forces.

The interlocking flange provides for greater threaded connection. Further, the flange itself reinforces and distributes the shearing forces, so as to enable the use of smaller diameter fasteners. Finally, users may find it easier to first interlock the flanged component into the smooth facing component before inserting and tightening the fastener(s).

While described and depicted with two flanged apertures 114A, 124A on the vertical facing of the leg assembly 115 and one flanged aperture 134B on the component facing 20, it will be understood that any number of flanged apertures may all be provided on the leg assembly 115 (including all or none), with the remainder being provided on the component facing 20. The use of at least two separate interlocking flanges/fasteners on one piece and an optional third flange/fastner on the corresponding piece (i.e., as described above) is preferred so as to distribute shearing forces more even and allow for consistent, leveled alignment of the component facing 20 with the leg assemblies 115.

A plurality of fasteners 110, 120, 130, such as threaded bolts, are used to attach the components as seen in the embodiment shown in FIGS. 3A and 3B. Bolts 110, 120 are associated with interlocking flanged connections 114A, 124A. Threaded ends 112, 122 that are received in the flanged, concentric recess 114A, 124A at on leg assembly 115 (which may be a tube or attachment leg as described above). The protruding flanges around apertures 114A 124A protrude out from the flat, smooth facing and have an appropriate diameter to interlock with (i.e., partially penetrate and rest within) corresponding, appropriately sized apertures 114B, 124B on the flat, smooth facing of component 20.

The inner facing of each aperture/recess 114A, 124A may be threaded to cooperate with corresponding threads on the distal ends 112, 122. The diameter of these recesses 114A, 124A cooperates with the diameter of the fasteners 110, 120 at their distal end, which penetrate apertures 114B, 124B on component 20. Here, the head of each bolt 110, 120 (i.e., the opposite end of each distal ends 112, 122) are sufficiently large enough to engage the outer edge aperture at 114B, 124B (i.e., the side that is not in direct physical contact with component 115). The aperture at 114B, 124B has: i) optional threads along its inner facing, and ii) the same diameter as the recess at 114A, 124A. The same arrangement holds true for the flanged aperture 134B on component facing 20, fastener 130, and corresponding aperture 134A on the leg assembly 115. Also, as noted above, the flanged apertures may be interchanged or arranged in other combinations.

The resulting connection has only a single shear facing, which eliminates the need for a U-shaped connector or support member as required by the prior art. In turn, this allows for the component facing 20 to have a reduced width, thereby improving the modularity of the overall system 100.

In some embodiments, fastener 130 may be an optional center bolt with a threaded end 132 that is received through apertures 134A, 134B and secured by a cooperating nut (not shown) fitted onto end 132. Further, the connection formed by bolt 130 may also incorporate an interlocking flange as described above.

The distal threaded end 132 of bolt 130 faces in an opposite direction in comparison to at least one of the other ends 112, 122, so that end 132 may be outwardly facing while the ends 112, 122 may be inwardly facing (or vice versa). The precise orientation of each end 112, 122, 132 can be altered, although it is preferred to have two of the bolts have an opposing relationship (i.e., one distal end faces inward, with the distal end of the second bolt faces outward).

Accordingly, fastener 130 may first be inserted through apertures 134A, 134B and then at least partially secured with an optional nut or other fastener (not shown). In the same manner, fasteners 110, 120 can then be fitted through apertures 114B, 124B on the facing 20 and rotatably tightened into their corresponding recesses 114A, 124A and/or fitted with a nut/additional fastener (not shown). Notably, the elevation and positioning of fastener 130 is offset/above the location of fasteners 110, 120. Also, center fastener 130 is preferably positioned equidistant between fasteners 110, 120 on a horizontal line. Stated differently, an imaginary, horizontal line can be drawn between the position of bolts 110, 120 such that the position of bolt 130 does not fall along that line. In one embodiment, the position of center bolt 130 is above (i.e., at a higher elevation) in comparison to that imaginary line between bolts 110, 120. This offset, non-in-line arrangement providers a wider clamping area for the attachment joint 100, thereby increasing the coupled components' overall rigidity.

The orientation and positioning of the fasteners 110, 120, 130 and their corresponding interlocking fits provides a larger shear area across which to distribute anticipated loads. This combination presents more thread engagement, and the use of an aperture with at least one of the bolts improves the ability to quickly and easily align the legs 115 and facing 20 during assembly.

Friction members 116, 126, 136, effectively act as bushings fitted around the flanges engaging or associated with each respective fastener 110, 120, 130. If optional bolt 130 does not rely on an interlock, friction member 136 may still be used to provide appropriate spacing between components 115, 20. Preferably, friction members 116, 126, 136 are of identical or nearly identical construction or, at least, of similar thickness so as to ensure alignment and maintain parallel orientation between the coupled components. Members 116, 126, 136 may also better distribute and reduce shear loading on the fasteners by further increasing the surface area of the compression connection.

As noted above, the flanged portions may be formed on the same or opposing faces, so long as when the components are paired consistent contact surface is formed. In some embodiments, that contact surface will be a flat, parallel surfaces. Nested, contoured, and/or cooperatingly curved surfaces may also be utilized, provide that the interlocking flanged connection described above is retained. Also, as noted above, more than two or three flanged interconnects may be provided.

One feature of the connection system 100 is the opposing, offset positioning of the fasteners 110, 120, 130. As noted above, this specific arrangement simplifies the alignment process while simultaneously providing a wider clamping area over which shearing forces may be distributed. The use of flanged, threaded appertures and multiple fasteners creates greater total thread engagement. The opposing nature of the fastener alignment is most preferably achieved by having the longitudinal axes of the fasteners in parallel orientation but with opposing distal orientations (i.e., at least one of the threaded ends 112, 124, 134 is on oriented on an opposite side in comparison to the others).

Although only three fasteners are described as attaining the benefits of the system 100, it will be understood that additional bolts and attachment points can be incorporated. That is, four or more fasteners may be used in combination with corresponding recesses/apertures to further improve the clamping force and reduce shear. In a preferred embodiment, at least one combination of fastener/aperture is centered relative to all of the other fasteners/apertures such that this central aperture may be used as the first coupling point, thereby simplifying the alignment of the remaining fasteners/apertures.

The use of multiple fasteners, with or without interlocking flanges and with or without friction members, allows for the system to be adapted to meet specific loads and rated capacities. That is, the use of only two fasteners with interlocking flange arrangements may accommodate a stated load or capacity rating, while adding friction members increases that load/rating. Further still, additional fasteners and/or interlocking flanges can allow for even higher loads/capacity ratings.

As seen in FIG. 3A, the apertures 114B, 124B, 134B may be reproduced in a vertically aligned series. In this manner, the height/elevation of the facing 20 may be adjusted by selecting a appropriate and corresponding set of apertures 114B, 124B, 134B during installation. That is, by selecting the lowermost set of apertures L, the elevation of the facing 20 is maximized relative to the vehicle towbed, while selection of the topmost apertures H would result in a lower profile between the towbed and kingpin receiver. Additionally or alternatively, it may be possible to provide a similar series of cooperating apertures 114A, 124A, 134A on the attachment leg 115 and/or support member 18 (if used).

While threaded bolts and nuts are described, other fasteners can be used. For example, rivets or non-threaded bolt members could be adapted accordingly. It may also be possible to use collars or other non-threaded fittings to secure the ends of the bolts.

The friction member can be of any appropriate type or construction. One feature of these members is that they will present greater friction than if the attachment leg assemblies 115 and facing 20 were joined without such pieces in place.

The materials of the connection system 100 should be selected for durability and cost. Metals and alloys including high strength steels are preferred for the fasteners 110, 120, 130. The friction members 116, 126, 136 may be formed from appropriate metal, polymer, or other materials, provided that the material itself has a relatively higher level of surface friction along at least a portion of the facings that come into contact with the coupled components.

The combination of multiple connection points, and particularly a third, offset point, along with interlocking flanges with friction member bushings creates a synergistic effect. The resulting single shear connection is tolerant to high loads, while simultaneously simplifying the assembly process by only requiring a single interface. Also, the interlocking flanges further simplifies the alignment procedure by affording a slide fit between the components before fasteners must aligned/inserted and tightened. Finally, the single facing allows for the interlocking components in a manner that is simply not possibly for the previously known double shear connectors 18 shown in FIGS. 1A and 1B.

Figure 4A:
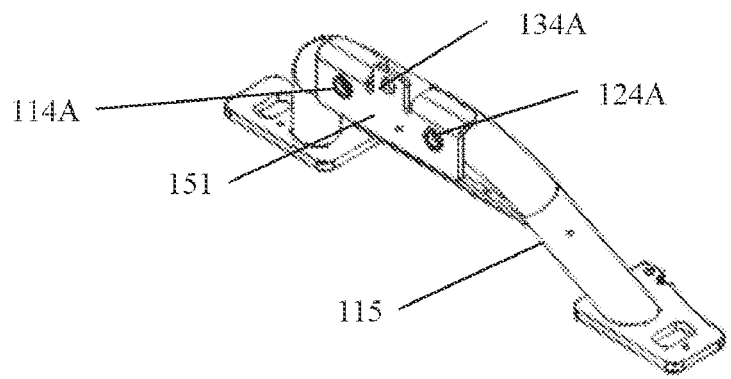
FIGS. 4A, 4B, and 4C are, respectively speaking, perspective, side, and front (i.e., taken along line A-A in FIG. 4B) views of the leg assembly according to certain disclosed aspects.
Figure 4B:
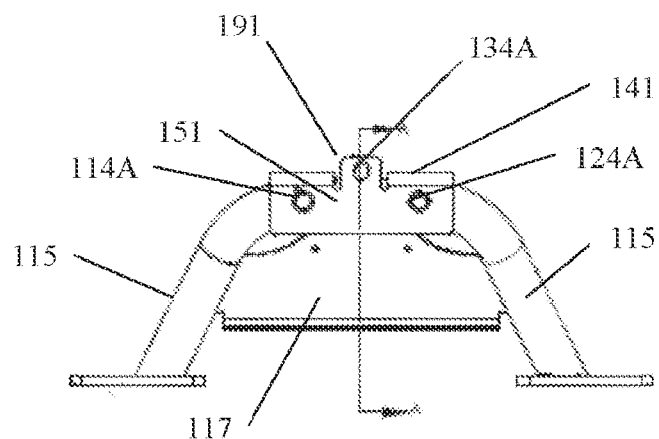
Figure 4C:
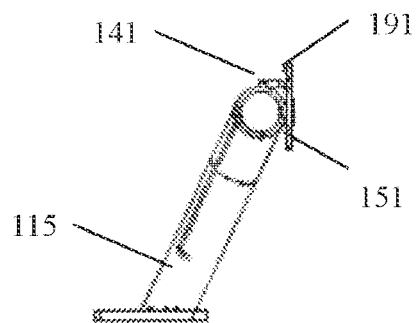

As seen in FIGS. 4A through 4C, the leg assembly 115 may be constructed to have an inwardly angled orientation. For example, relative to an axis vertical to the ground, each leg may be angled inwardly at about 10° to 40°, and more specifically at about 25° (+/−5°). A support member 117 may be positioned between the downward extending members of leg assembly 115, while an engagement plate 151 having connections points 114A, 124A, 134A (described above) may be attached to or integrally formed as part of each leg assembly 115. A pair of horizontal flanges 141 may be imparted onto the top edge of plate 151, with a central upright section 191 carrying connection point 134A positioned between the two flanges 141.

The facings, flanges, and ports required by the connection system may be formed on the parts by way of casting, welding, and/or forging. In the alternative, methods such as friction drilling can be employed. The components may be constructed of any appropriate material, although various alloys of steel may be particularly well suited owing to their structural properties and cost. Also, while tubular members are most ideally provided as hollowed objects, in some embodiments, partially or completely solid members can be used.

One advantage of the system 100 is that it allows for a wider range of loads and rated capacities to be accommodates without have to re-engineered specific components within the assembly. This design flexibility may be accommodated simply by altering the number of fasteners 110, 120, 130. Further changes to relatively minor components, such as the friction members 116, 126, 136 and/or the materials used in the fasteners 110, 120, 130, may allow for further adjustment of the load capacity while maintaining the basic structure of leg assemblies 115. In this manner, loads ranging from 16,000 up to 27,000 or even 32,000 pounds can be accommodated with minimal to no change in the components described above.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A system comprising:
a fifth wheel hitch assembly;
a component facing attached with the fifth wheel hitch assembly;
a leg assembly configured to be attached to a mounting system positioned on a towing vehicle at two points;
an engagement plate attached with the leg assembly;
a first fastener cooperating with a first flanged aperture on a vertical facing of the engagement plate and wherein the first flanged aperture is received by a corresponding first aperture in the component facing of the fifth wheel hitch;
a second fastener cooperating with second apertures on the component facing and the vertical facing;
a third fastener cooperating with third apertures on the component facing and the vertical facing;
wherein the first, second, and third fasteners each have a longitudinal axis and the longitudinal axes of the first, second, and third fasteners are all aligned in a parallel orientation; and
wherein the first flanged aperture and the second aperture on the vertical facing are positioned along a substantially horizontal line and the third aperture on the vertical facing is above the horizontal line.

2. The system according to claim 1, wherein the first fastener has a distal, threaded end received in a threaded portion of the first flanged aperture.

3. The system according to claim 2, wherein at least one of the second and third fasteners has a distal threaded end received in a threaded portion of the second and/or one of the third aperture.

4. The system according to claim 3, wherein the distal, threaded end of the first fastener is disposed opposite to the distal, threaded end of the at least one of the second and third fasteners.

5. The system according to claim 1, wherein the pair of third aperture are centered between the first flanged aperture and the second aperture.

6. The system according to claim 5 further comprising at least one friction member provided proximate to each or all of the first, second, and third fasteners.

7. The system according to claim 1 further comprising at least one friction member provided proximate to each or all of the first, second, and third fasteners.

8. The system according to claim 1, wherein a first of the pair of second apertures includes a second flange and a second of the pair of second apertures receives the second flange.

9. The system according to claim 8, wherein a first of the pair of third apertures includes a third flange and a second of the pair of third apertures receives the third flange.

10. The system according to claim 1 further comprising a support member positioned between downward extending members of the leg assembly.

11. A system for connecting vehicle components, the system comprising:
a fifth wheel hitch assembly;
a component facing attached with the fifth wheel hitch assembly
a leg assembly;
an engagement plate attached with the leg assembly, wherein the engagement plate is attached to the component facing by way of an interlocking flange having a port receiving a flanged aperture and wherein the flanged aperture receives a fastener; and
at least one horizontal flange imparted onto a top edge of the engagement plate, wherein the horizontal flange engages the leg assembly.

12. The system according to claim 11, wherein the interlocking flange includes a friction member fitted around the flanged aperture.

13. The system according to claim 11, wherein a distal end of the fastener has threads which engage corresponding threads positioned within the flanged aperture.

14. The system according to claim 11, wherein the port is a through-aperture or a recess.

15. The system according to claim 11, further comprising at least one or more additional interlocking flanges.

16. The system according to claim 15, wherein the plurality of interlocking flanges comprises three interlocking flanges and where one of the interlocking flanges is positioned vertically offset at a midpoint between two horizontally aligned interlocking flanges.

17. The system according to claim 15, wherein a series of paired ports are provided at different elevations along the single shear surface so that each flanged aperture may be received by any one of the series of paired ports.

18. The system according to claim 11, further comprising a single shear surface, wherein a series of ports are provided at different elevations along the single shear surface so that the flanged aperture may be received by any one of the series of ports.

19. The system according to claim 11 further comprising a support member positioned between downward extending members of the leg assembly.

* * * * *